United States Patent
Lei

(10) Patent No.: US 6,363,822 B2
(45) Date of Patent: *Apr. 2, 2002

(54) PARALLEL ARM SCROLL SAW AND DRIVE MECHANISM WITH VISUAL SPEED INDICATOR APPARATUS

(75) Inventor: Xun Lei, Cheswick, PA (US)

(73) Assignee: Delta International Machinery Corp., Jackson, TN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/268,848

(22) Filed: Mar. 16, 1999

(51) Int. Cl.[7] ............................................. B27B 19/02
(52) U.S. Cl. .............................. 83/58; 83/783; 83/662; 83/DIG. 1
(58) Field of Search .................... 83/783, 784, 786, 83/662, 58, 62, 62.1, DIG. 1; 30/394

(56) References Cited

U.S. PATENT DOCUMENTS

| RE7,726 E | 6/1877 | Plummer |
|---|---|---|
| D85,847 S | 12/1931 | Tautz |
| 2,721,587 A | 10/1955 | Dremel |
| 4,616,541 A | 10/1986 | Eccardt et al. |
| 4,681,006 A | 7/1987 | Miller |
| D292,713 S | 11/1987 | Miller |
| 4,841,823 A * | 6/1989 | Brundage |
| 4,949,616 A | 8/1990 | Chang |
| 5,065,652 A * | 11/1991 | Legler et al. |
| 5,088,369 A | 2/1992 | Rice et al. |
| 5,228,376 A * | 7/1993 | Huang |
| 5,235,890 A | 8/1993 | Mathre |
| 5,363,733 A | 11/1994 | Baird et al. |
| 5,520,081 A * | 5/1996 | Rice et al. |
| 5,694,825 A * | 12/1997 | Chang |
| D417,227 S * | 11/1999 | Lei |
| 6,267,038 B1 | 7/2001 | O'Banion et al. |

OTHER PUBLICATIONS

*Delta 1997/98 Building Trades and Home Shop Machinery*, pp. 57–61, Month unknown.
*Makita 16" Variable Speed Scroll Saw Model SJ401 Instruction Manual*, pp. 1–19, Date unknown.
*Delta 1997/98 Industrial Machinery Catalog*, pp. E–2 and E–3, Month unknown.
*Delta 2 Speed 16" Scroll Saw with Quickset Blade Changing Feature (Model 40–560 Type II) Instruction Manual*, May 3, 1995, pp. 1–18.
"The New Constant–Tension Scroll Saws, Great in a Tight Spot!", *Wood Magazine*, Dec., 1985, pp. 54–59, 74.
Pittman, "Scroll Saw or Jig Saw", *Woodworkers Buyer's Guide to Power Tools*, 88–90 and Comparison charts and options, which are not numbered, Date unknown.
*Delta 18" Scroll Saw Instruction Manual*, Oct. 2, 1989, pp. 1–15.
*The Eagle Precision Scroll Saw*, from RBI Industries, Inc., Date unknown.

\* cited by examiner

Primary Examiner—Kenneth E. Peterson
(74) Attorney, Agent, or Firm—Kirkpatrick & Lockhart LLP

(57) ABSTRACT

An arm configuration used in a scroll saw that allows the two arms to move substantially independently of one another and having a retaining mechanism which isolates one of the arms if one arm becomes disengaged from the saw blade or the saw blade breaks. A speed indicator that allows the user to easily determine the speed of the saw visually. A drive assembly including a pulley system that provides for increased torque and the saw to have a wide range of speeds.

13 Claims, 10 Drawing Sheets

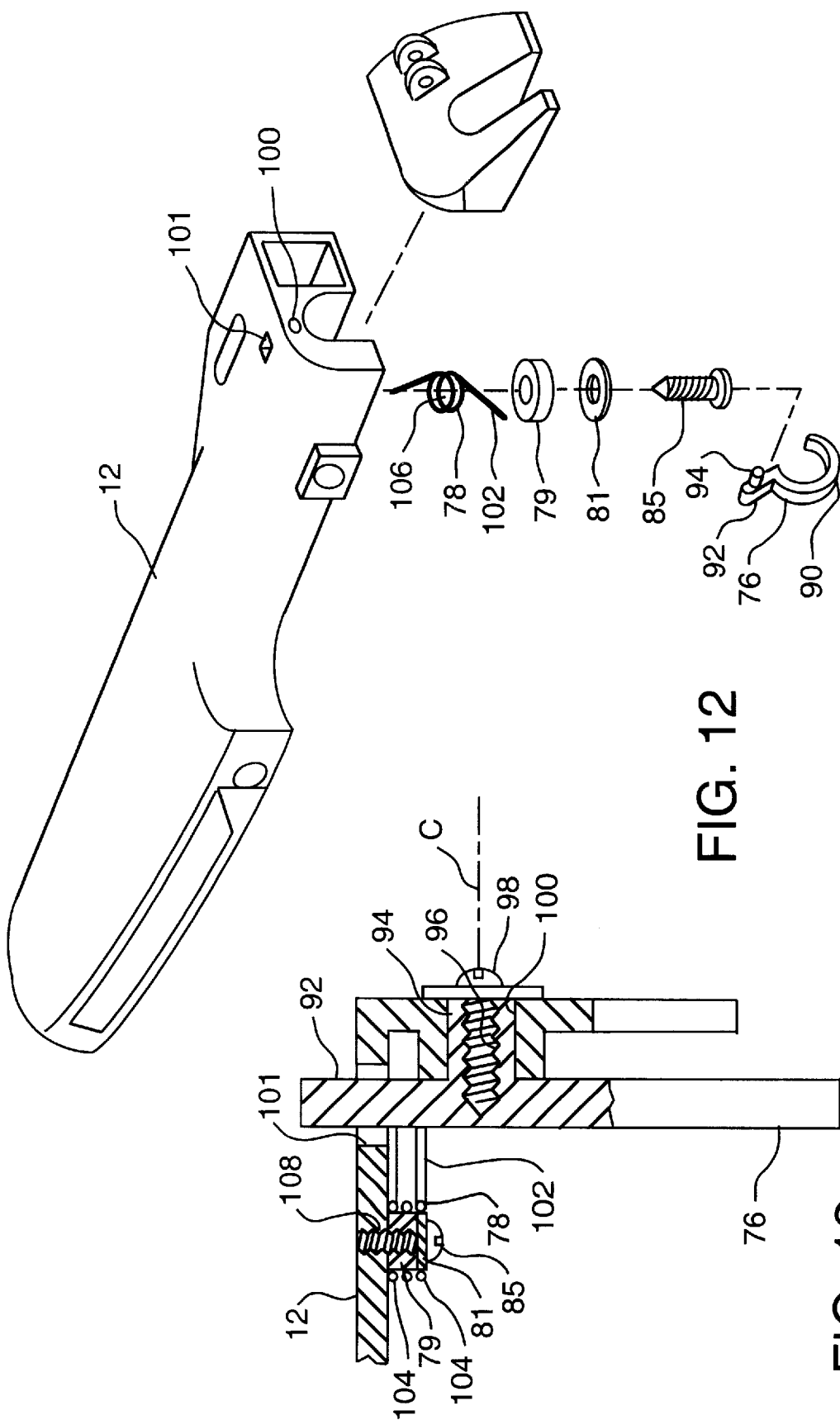

PARALLEL ARM SCROLL SAW AND DRIVE MECHANISM WITH VISUAL SPEED INDICATOR APPARATUS

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of the Invention

The present invention is directed generally to an apparatus for a saw. More particularly, the present invention concerns an apparatus for a scroll saw that enables the parallel arms to move substantially independently of each other and that includes a retaining mechanism for one of the parallel arms. The present invention also relates to a drive mechanism and visual speed indicator that provides increased torque, a wide range of cutting speeds and allows for the visual determination of the speed of a saw blade.

2. Description of the Background

One type of conventional scroll saw has two parallel arms which are fixedly connected to each other at one end by a rear link. Each parallel arm also has a free end between which a saw blade extends and is connected thereto. The lower parallel arm is connected directly to a motor that moves the lower arm and the saw blade in a reciprocating motion. Because the lower arm and the upper arm are fixedly connected to one another by the rear link, the lower arm forces the upper arm to move in a corresponding manner to that of the lower arm. The disadvantage to this type of scroll saw is that if the saw blade becomes disengaged from one of the parallel arms or the saw blade breaks, the upper parallel arm will continue to move because it is fixedly connected to the lower parallel arm and, as a result, the broken or detached blade may mar the workpiece. Furthermore, the parallel arms may move out of sync resulting in the saw being damaged.

Conventional saws, drill presses, planers, etc. also typically include a drive mechanism and speed control apparatus for controlling the speed of the drive mechanism. One type of drive mechanism and speed control device employed with a scroll saw comprises a drive motor that is directly connected to the lower arm for moving the arms in a reciprocating motion. A speed control is employed to regulate the speed of the drive motor. The speed control is manually operable by virtue of an on/off dial knob, wherein indicia representing speed measurements is displayed around the knob. In most scroll saw applications, the range of speed of the motor is generally between 400 revolutions per minute (rpm) and 1600 rpm. The user's choice of motor speed is dependent upon the workpiece material and the type of cut is to be made. The disadvantage of this type of drive mechanism and speed control device is that the user is limited to a small range of speed which constrains the type of cut that can be made and the type of workpiece material that can be used. Furthermore, the dial setting, which is usually in small print, can be difficult for the user to read, especially during operation of the saw.

Accordingly, there is a need for a scroll saw that has arms that move substantially independently of one another and that isolates the movement of one of the arms if an arm becomes inadvertently disengaged from the saw blade or the saw blade breaks. There is another need for a drive mechanism and visual speed indicator that is easily observed during operation and that enables the saw to make various cuts on a variety of workpiece materials. There is still another need for a drive mechanism and visual speed indicator that can be easily observed and employed on a myriad of other driven devices, tools, etc.

BRIEF SUMMARY OF THE INVENTION

The present invention provides an arm configuration for a saw having spaced apart arms with a blade extending between and connected to the free ends of the arms and a link member extending between and connected to the other ends of the arms, wherein the arm configuration is constructed to allow the arms to move substantially independently of one another.

The present invention provides a scroll saw having two parallel arms that move substantially independently of one another such that if the saw blade breaks or becomes disengaged from the upper parallel arm, the motion of the upper parallel arm may be stopped to prevent marring of the workpiece or damage to the saw. A link member extends between and connects the distal ends of the two parallel arms and a saw blade extends between and is connected to the proximate ends of the two parallel arms. The link member is pivotably attached to one of the two parallel arms and is slideably attached to the other of the two parallel arms.

The present invention also includes a mechanism that will retain the upper parallel arm if the upper parallel arm becomes disengaged from the saw blade or the saw blade breaks thus, preventing the upper parallel arm from marring the workpiece or damaging the arm configuration. The upper arm retaining mechanism can take the form of a hook-shaped member which is spring loaded and pivotally mounted adjacent is the upper parallel arm.

The present invention further provides a drive mechanism and visual speed indicator which allows for easy verification of the speed of the saw, increased torque and the ability to cut a variety of materials and make a variety of cuts. The drive mechanism and visual speed indicator may be a motor and drive pulley assembly having a transparent pulley cover, wherein the drive belt is highly visible. The user can verify the speed of the pulleys by comparing the position of the drive belt on the pulleys with a speed chart placed on the saw.

The present invention further provides the arm configuration to be sized and proportioned to comfortably maneuver and accept a large workpiece. The space between the two parallel arms of the scroll saw which accepts the workpiece is unobstructed and large enough to maneuver and accept a variety of sized and shaped workpieces.

The present invention further provides that the two parallel arms are made from a composite material. The composite material may be a composite fiber cloth material impregnated with polymer material, wherein the fiber cloth may be carbon fibers.

The present invention solves problems experienced with saws. Those and other advantages and benefits of the present invention will become apparent from the description of the preferred embodiments hereinbelow.

BRIEF DESCRIPTION OF THE SEVERAL VIEWS OF THE DRAWINGS

For the present invention to be understood and readily practiced, the present invention will be described in conjunction with the following Figures, wherein:

FIG. 12 is an exploded view of the retaining mechanism and a portion of the housing covering the upper parallel arm of the scroll saw shown in FIG. 1; and FIG. 13 is a partial longitudinal sectional view of the portion of the housing that the retaining mechanism is pivotably connected thereto.

DETAILED DESCRIPTION OF THE INVENTION

The present invention will be described below in terms of a scroll saw. It should be noted that describing the present invention in terms of a scroll saw is for illustrative purposes and the advantages of the present invention may be realized using other structures and technologies that have a need for an arm configuration, wherein the arms can move substantially independently of each other and/or a drive mechanism with a speed indicator which provides a quick and easy method of visually determining the device's speed.

It is to be understood that the Figures and descriptions of the present invention have been simplified to illustrate elements that are relevant for a clear understanding of the present invention, while eliminating, for purposes of clarity, other elements and/or descriptions thereof found in a typical scroll saw. Those of ordinary skill in the art will recognize that other elements may be desirable in order to implement the present invention. However, because such elements are well known in the art, and because they do not facilitate a better understanding of the present invention, a discussion of such elements is not provided herein.

Figure 1:
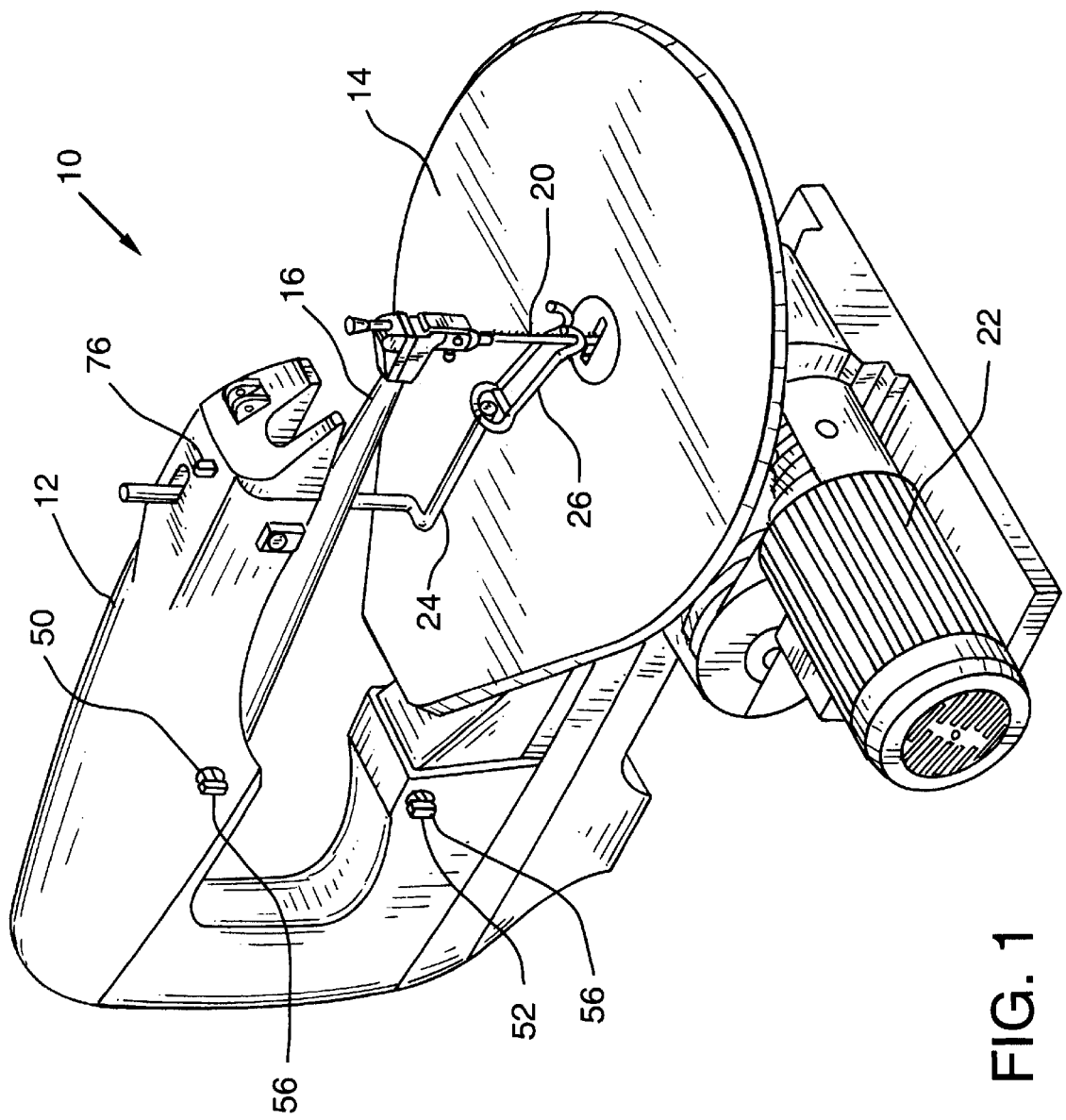
FIG. 1 is a perspective view of a scroll saw employing one embodiment of the present invention.
Figure 2:
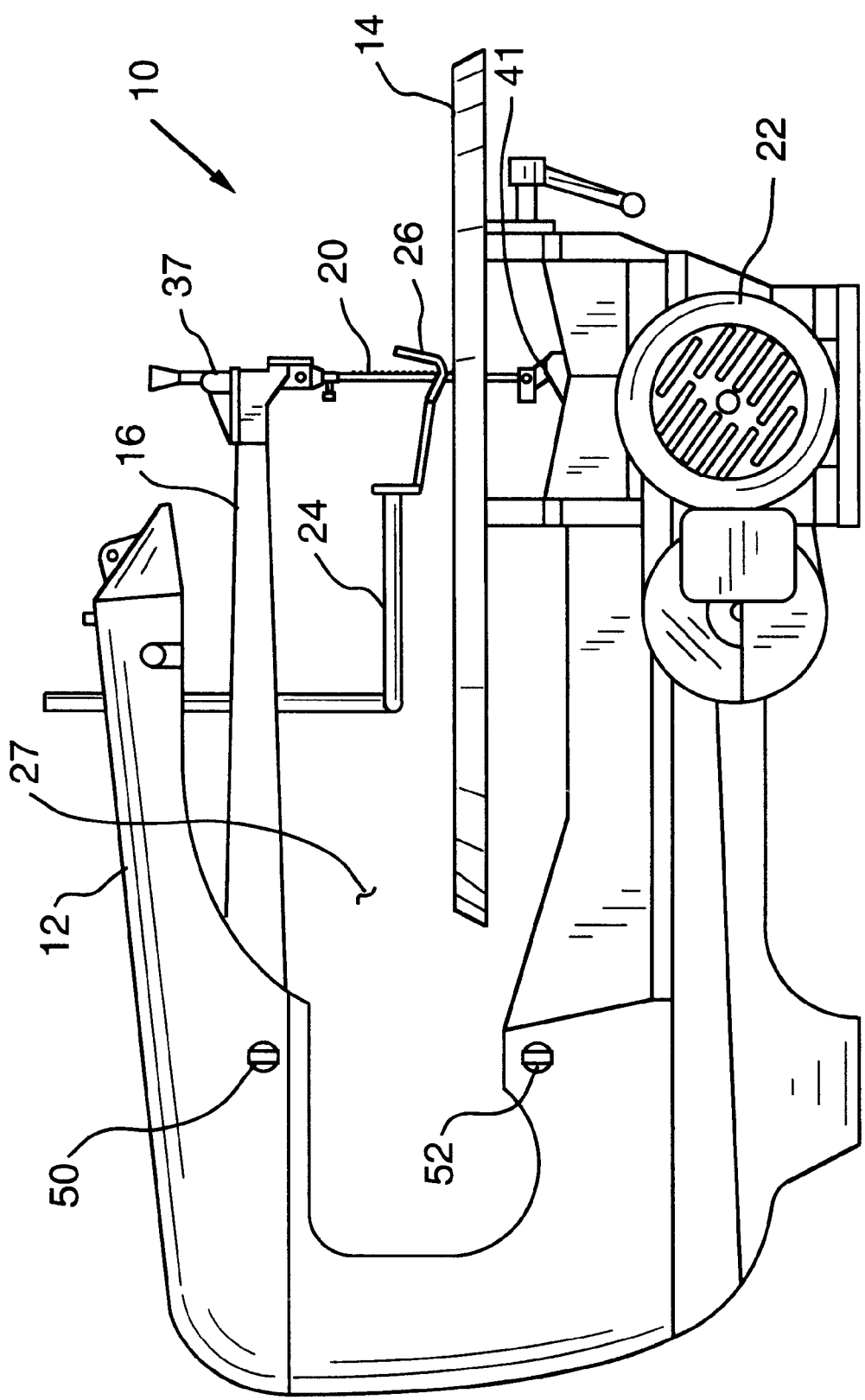
FIG. 2 is a front view of the scroll saw shown in FIG. 1.
Figure 3:
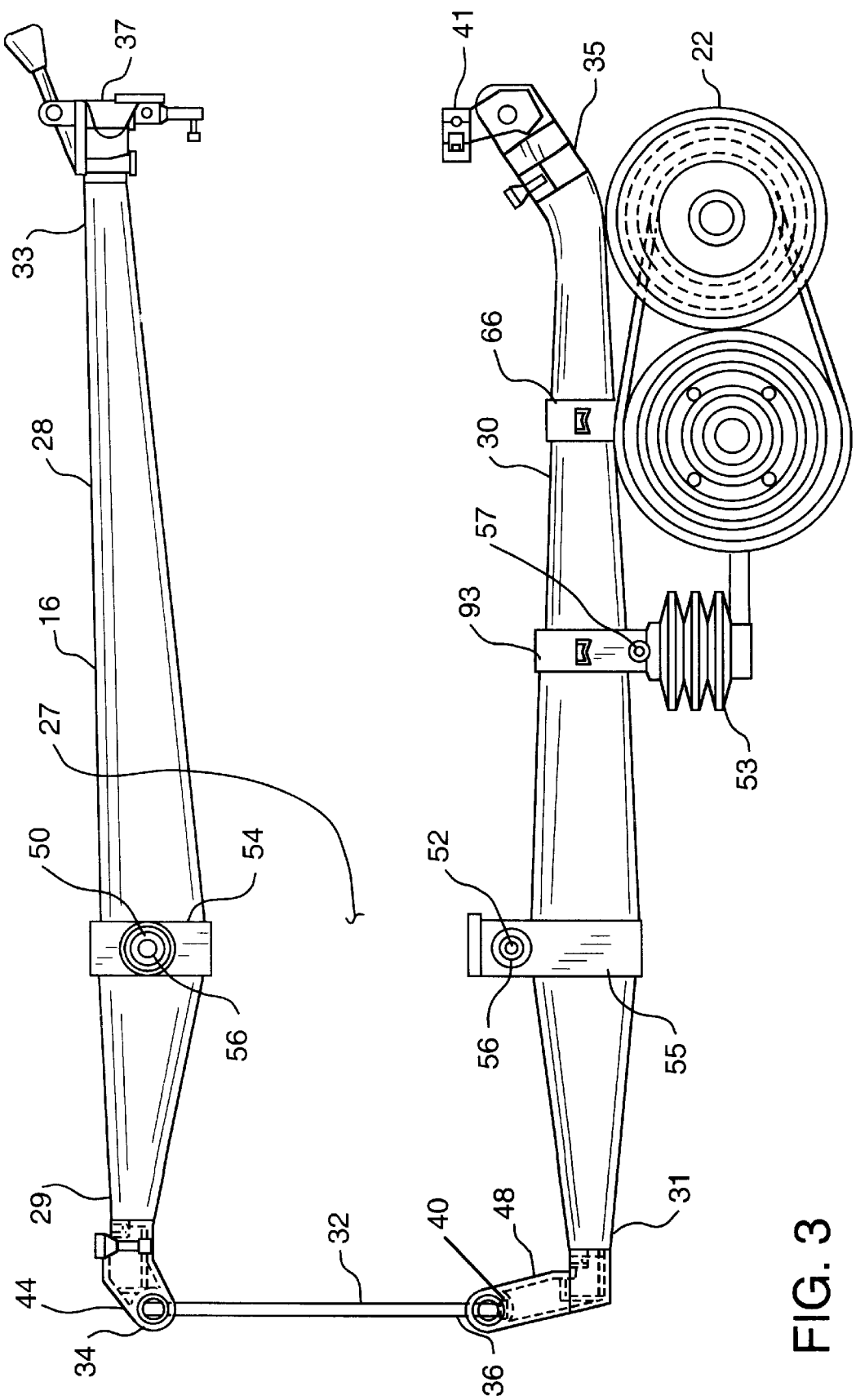
FIG. 3 is a front elevational view of the parallel arm configuration and a portion of the motor and drive pulley assembly of the scroll saw shown in FIG. 1.
Figure 4:
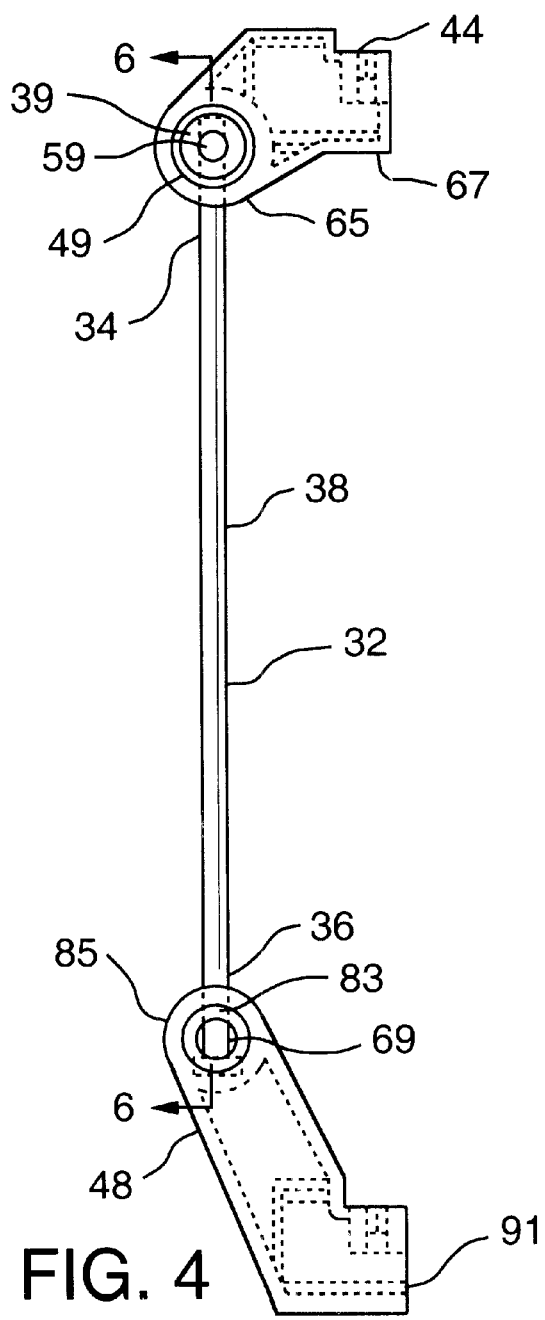
FIG. 4 is a front elevational view of the link member, the upper bracket and the lower bracket of the scroll saw shown in FIG. 1.
Figure 5:
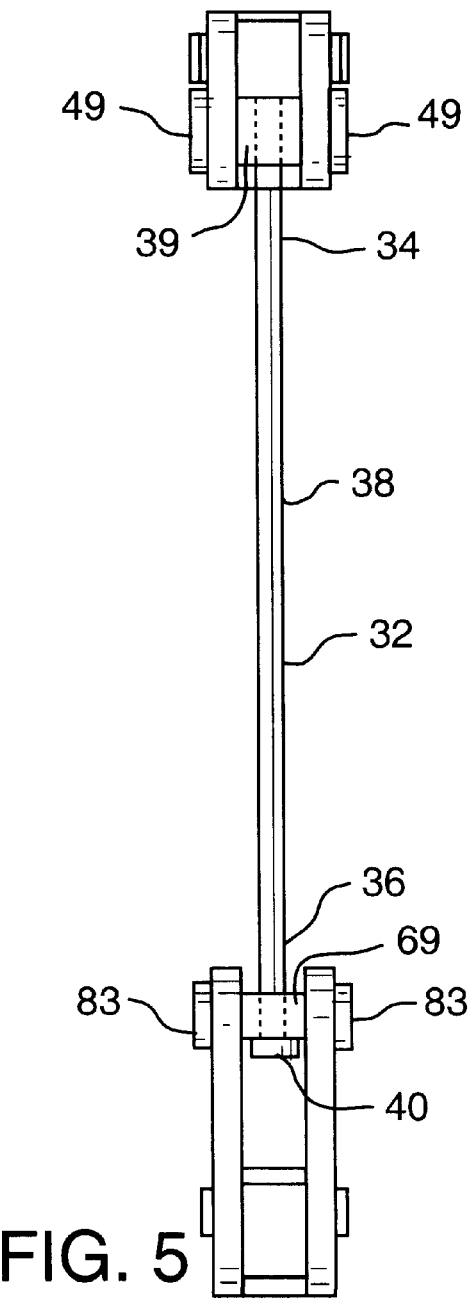
FIG. 5 is a side elevational view of the link member, the upper bracket and the lower bracket of the scroll saw shown in FIG. 4.

FIGS. 1 through 3 illustrate a scroll saw 10 of the present invention substantially comprising a housing 12, a table 14, a parallel arm assembly 16, a conventional blade 20, a motor and drive pulley assembly 22, a hold down bar 24 and a hold down foot 26. The scroll saw 10 is also generally depicted in co-pending U.S. design patent application Ser. No. 29/101,993, being filed concurrently with the present application and entitled Scroll Saw and issued as U.S. Pat. No. D417227 on Nov. 30, 1999, the entire disclosure of which is hereby incorporated by reference.

An exemplary parallel arm assembly 16 of the present invention, shown in greater detail in FIGS. 3 through 6, substantially comprises an upper arm 28, a lower arm 30 and a link member 32 connected to and extending between the end 29 of the upper arm 28 and the end 31 of the lower arm 30, both of which are distal to the saw blade 20. The upper arm 28, the lower arm 30 and the link member 32 are sized and proportioned such that a relatively large workpiece can be maneuvered and accepted within the opening 27 defined by the upper arm 28, the lower arm 30 and the link member 32. In this embodiment, the horizontal length from the saw blade 20 to the portion of the housing 12 that houses the link member 32 is approximately twenty (20) inches. The skilled artisan will appreciate, however, that such distance can be advantageously sized to provide the saw with the desired capabilities without departing from the spirit and scope of the present invention.

The upper and lower arms 28 and 30 are made from a graphite composite material and are hollow along their lengths. A composite material is that constructed of a matrix material reinforced by a fibrous material. The composite material used to produce the upper and lower arms 28 and 30 of the present invention comprises a composite fiber cloth impregnated in a matrix of a temperature-cured resin-derived polymer. The composite material is a carbon fiber cloth impregnated in a cured epoxy resin. The thickness of the wall of the hollow upper and lower arms 28 and 30 is substantially uniform. The composite material upper and lower arms 28 and 30 of the present invention can be produced by a conventional blow-mold manufacturing process known to those of ordinary skill in the manufacturing art. Such a process is typically used to manufacture familiar items such as tennis rackets. Accordingly, one of ordinary skill advised of the shape and intended function of the finished product could produce the product by a conventional blow molding process without undue experimentation. The composite material of the upper and lower arms 28 and 30 is described in further detail in U.S. patent applications Ser. Nos. 08/870,886 and 09/041,980, the entire disclosures of which are hereby incorporated by reference. Those of ordinary skill in the art will further appreciate, however, that arms 28 and 30 may be fabricated from other suitable materials, such as, for example, iron, steel, etc.

The saw blade 20 is releasably attached to the proximate end 33 of the upper arm 28 and the proximate end 35 of the lower arm 30 by any known means. A blade tensioning apparatus, generally designated as 37, can releasably attach the blade 20 to the proximate end 33 of the upper arm 28. A blade clamp mechanism 41 can releasably attach the blade 20 to the proximate end 35 of the lower arm 30. The blade tensioning apparatus 37 and the blade clamp mechanism 41 are disclosed in greater detail in U.S. Pat. Nos. 5,363,733 and 4,681,006, the entire disclosures of which are hereby incorporated by reference. Those of ordinary skill in the art will further appreciate, however, that other blade tensioning apparatus and blade clamp mechanisms may be used in the present invention.

Figure 6:
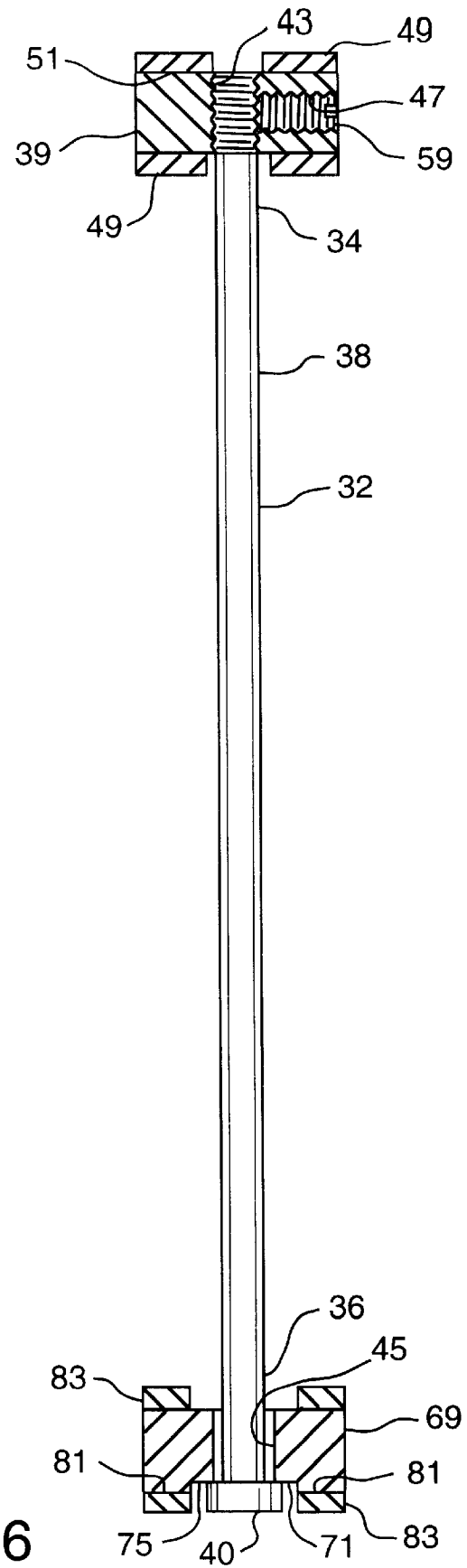
FIG. 6 is a partial sectional view of the link member shown in FIG. 4 taken along line 6—6 in FIG. 4.

Referring to FIG. 6, the link member 32 substantially comprises a shaft 38 having a rod 39 traversely attached at the first end portion 34 of the shaft 38. Specifically, the rod 39 has a substantially cylindrical threaded opening 43 that transverses the center portion of the longitudinal axis of the rod 39. The opening 43 receives the first end portion 34 of the shaft 38 which is also threaded and fixedly connects the rod 39 to the shaft 38. The rod 39 has a second threaded opening 47 that is substantially cylindrical, and positioned concentric with the longitudinal axis of the rod 39. The second opening 47 receives a set screw 59 which further fixedly connects the rod 39 to the shaft 38. The set screw 59 prevents the connection between the shaft 38 and the rod 39 from loosening due to the reciprocating motion of the arms 28 and 30.

A bushing 49 is connected on each end of the rod 39 by a slide fit. Bushings 49 have recesses 51 that receive the ends of rod 39 and allow for the rod 39 to rotate relative to the bushings 49. The bushings 49 are received within circular bores 65 of the upper bracket 44 by a press fit. See FIGS. 3 and 4. The upper bracket 44 further defines a rectangular opening at 67, shown in hidden lines, that receives the distal end 29 of the upper arm 28. The rectangular opening is sized and proportioned to correspond to the upper arm distal end 29. The distal end 29 of the upper arm 28 is fixedly connected to the upper bracket 44 by two screws (not shown).

As seen in FIG. 6, the second end portion 36 of the shaft 38 is slideably received by opening 45 of a cylindrical bar 69. The opening 45 transverses the longitudinal axis of the bar 69 at its center portion. The opening 45 expands to form a larger portion 71 that receives the stop member 40 of the link member 32 such that a ledge 75 is formed. The ends of the bar 69 are each received by a cylindrical cavity 81 defined by bushings 83. Bushings 83 are rotatably connected to the bar 69 with a slide fit, and fixedly connected to the lower bracket 48 by being press fitted in the circular bores 85 of the lower bracket 48. See FIGS. 3 and 4. As with the upper bracket 44, the lower bracket 48 has a rectangular opening at 91, shown in hidden lines, that receives the lower arm 30. The lower arm 30 is fixedly connected to the lower bracket 48 by two screws (not shown). It will be appreciated that the slideable and rotatable connections of the link member 32 to the lower and upper arms 30 and 28, respectively, can take many other forms.

As seen in FIGS. 1–3, the upper arm 28 is pivotally supported relative to the housing 12 at 50 by collar 54 and a pivot bolt 56. The collar 54 is a circular collar that is received on the upper arm 28 and is attached thereto by the pivot bolt 56. The pivot bolt 56 extends through the collar 54, the housing 12 and the upper arm 28. The head portion of the pivot bolt 56 projects from the housing 12, as shown in FIG. 1 at 50, and the threaded portion of the pivot bolt 56 engages a tapped hole (not shown) in the housing 12. The pivot bolt 56 defines an axis about which the upper arm 28 pivots relative to the housing 12. The lower arm 30 is also pivotally connected to the housing 12 at 52 by collar 55 and a second pivot bolt 56. The collar 55 is U-shaped such that the lower arm 30 extends between the two legs of the U-shaped collar 55 and the pivot bolt 56 clamps the two legs together. The pivot bolt 56 also extends through the housing 12. The head portion of the pivot bolt 56 projects from the housing 12, as shown in FIG. 1 at 52, and the threaded portion of the bolt 56 engages a tapped hole (not shown) in the housing 12.

A bellows 53 is fixedly disposed within the housing 12 and attached to the lower arm 30 by a bellows collar 93 and a fastener 57. The bellows collar 93 comprises a U-shaped is member that fits around the lower arm 30 such that the legs of the U-shaped member extend downward and are clamped together by fastener 57. The fastener 57 is a screw which extends through a lip (not shown) of the bellows 53 and the legs of the U-shaped member, wherein the screw is held in this position by a nut (not shown). As the lower arm 30 moves up and down, the bellows 53 causes a flow of air to be pumped through an air nozzle (not shown) that is used to blow saw dust away from the workpiece during cutting thereof.

Figure 7:
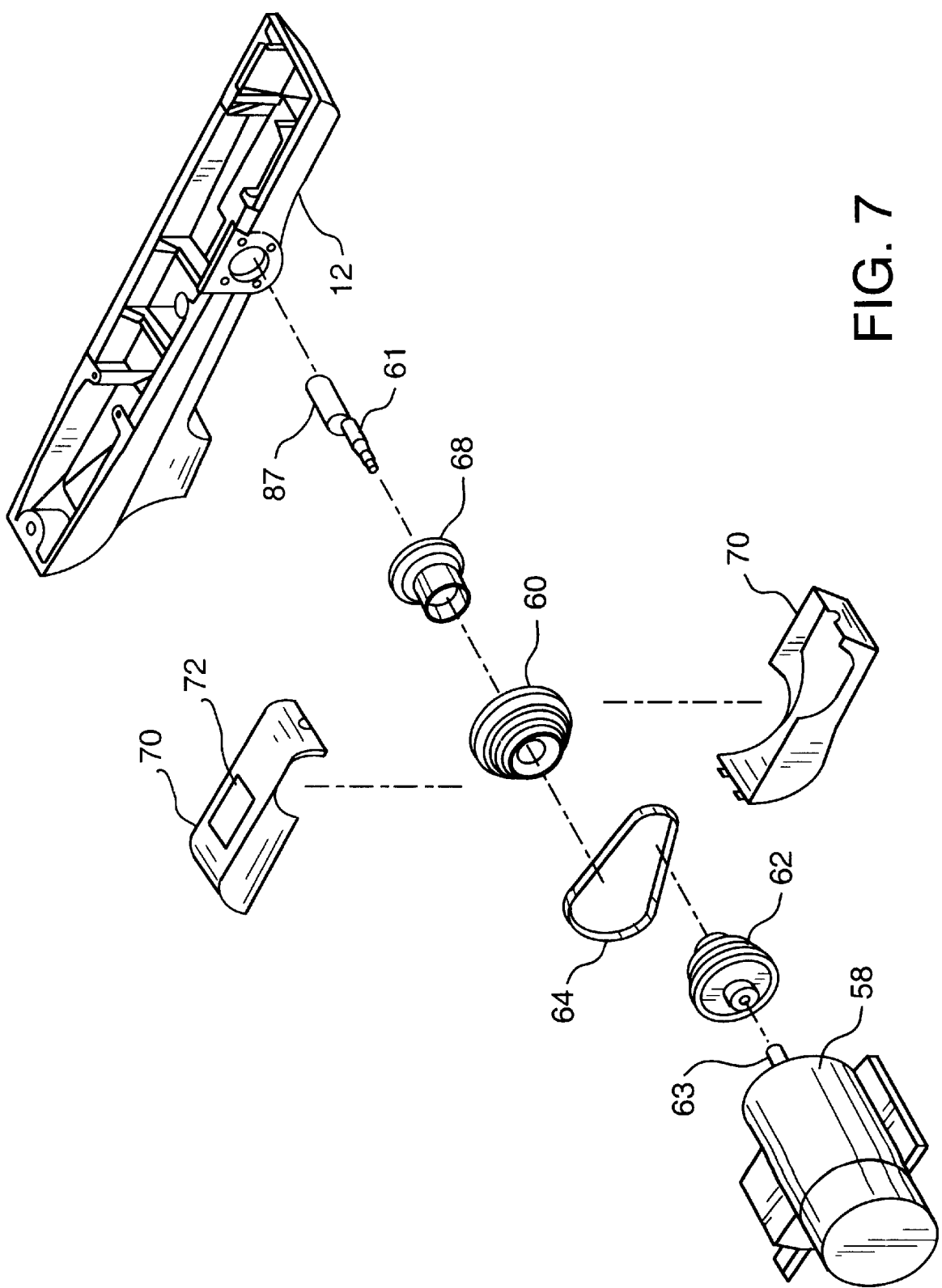
FIG. 7 is an exploded view of the motor and drive pulley assembly of the scroll saw shown in FIG. 1.
Figure 8:
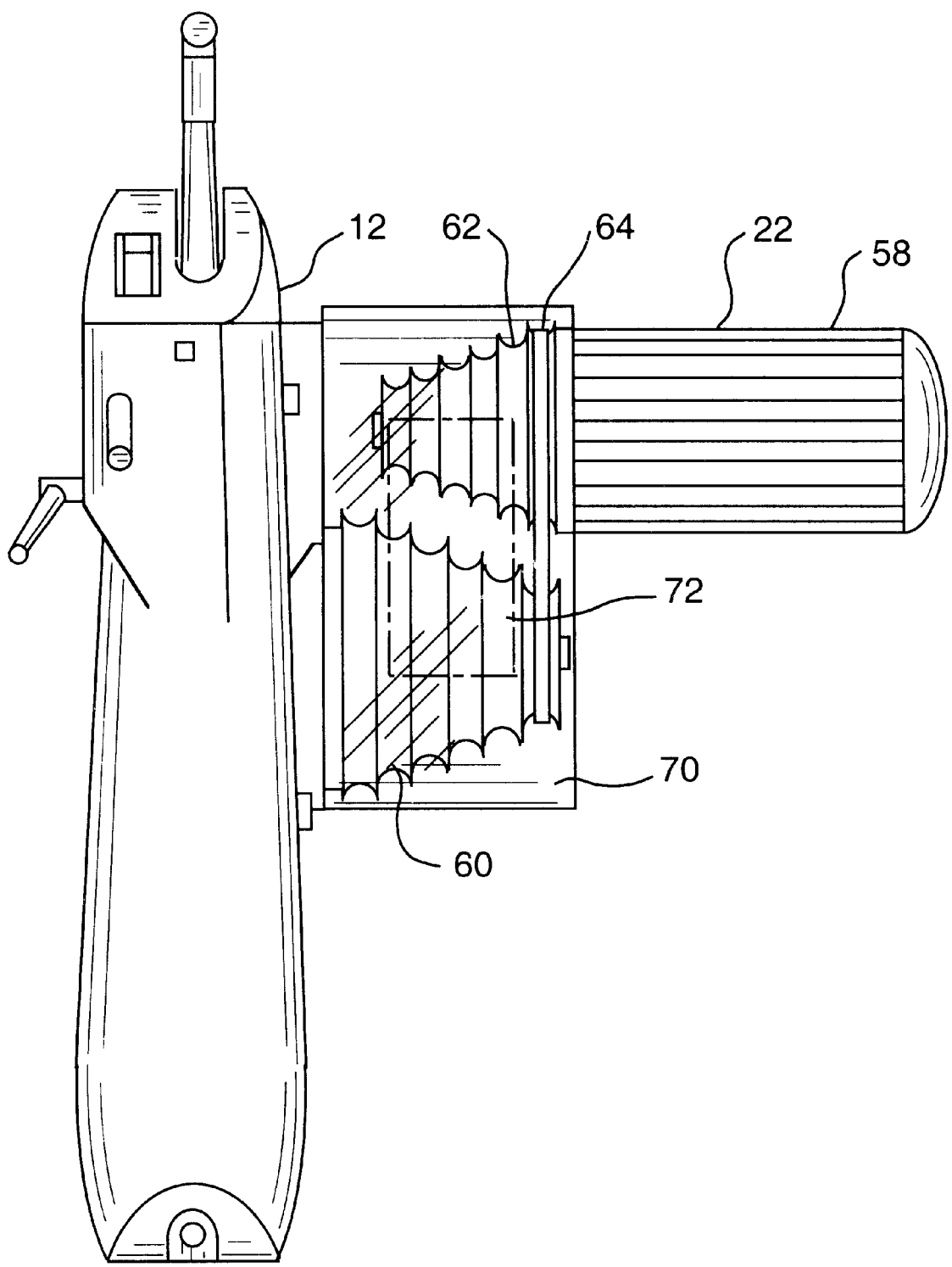
FIG. 8 is a top view of the scroll saw shown in FIG. 1 with the table removed and with a pulley speed chart label of the present invention shown in chain line.
Figure 9:
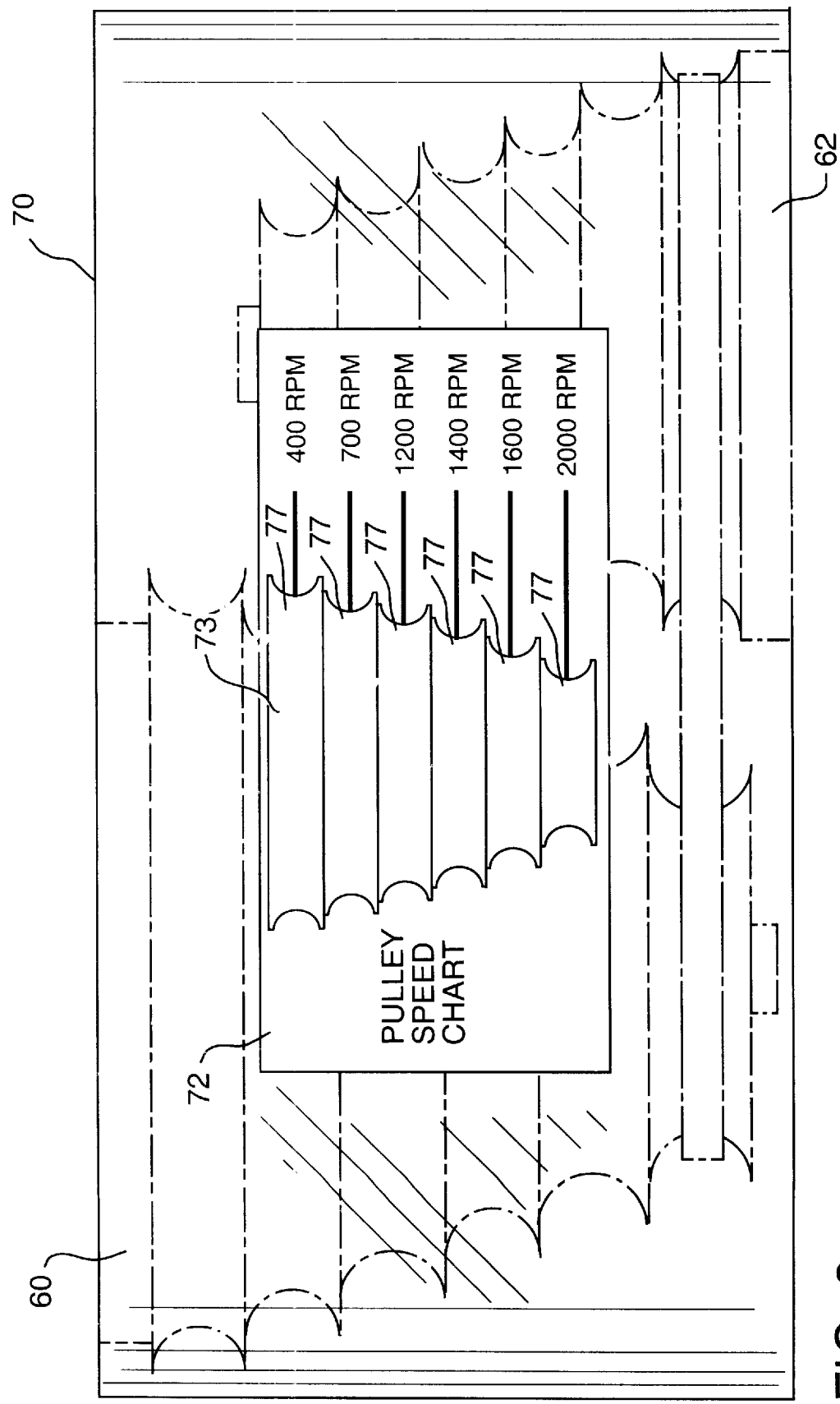
FIG. 9 is a top view of the pulley cover and speed chart label shown in FIG. 8 with the pulleys of the motor and drive pulley assembly shown in chain line.

The motor and drive pulley assembly 22, shown in greater detail in FIGS. 7 through 9, substantially comprises a motor 58, a driven pulley 60, a drive pulley 62 and a drive belt 64. The motor 58 is a single phase alternating current (AC) induction motor; however, a direct current (DC) variable speed motor could also be used. The motor 58 is connected to the drive pulley 62 by shaft 63. The driven pulley 60 has a bearing housing 68 that houses the bearings (not shown) upon which the driven pulley 60 rotates. The driven pulley 60 and the drive pulley 62 are made from cast iron.

The drive belt 64 extends around both the driven pulley 60 and the drive pulley 62 and is a highly visible color such as yellow, red or florescent green. The driven pulley 60 is connected to shaft 61 which is further connected to an eccentric shaft 87. The longitudinal axis of the eccentric shaft 87 is offset from the longitudinal axis of shaft 61. The eccentric shaft 87 is connected to the lower arm 30 by the drive collar 66, shown in FIG. 3, and a fastener (not shown). This connection between the shaft 61, eccentric shaft 87 and the drive collar 66 is similar to the crankshaft in an automotive engine, which converts the rotation of a shaft into the linear movement of a piston. The use of this pulley system generates more torque than those DC variable induction motors that are commonly used on other scroll saws.

A transparent cover 70 having a label 72 is placed over the driven pulley 60 and the drive pulley 62. The label 72, shown in FIGS. 7 through 9, has a speed chart thereon that is centrally disposed on the cover 70 such that the user can quickly determine the speed of the driven pulley 60 by identifying the position of the drive belt 64 with respect to the driven pulley 60 and comparing this with the speed chart on the label 72. The range of speed of the driven pulley 60 in this example is between 400 rpm and 2000 rpm. The label 72, shown in FIG. 9, illustrates a reference pulley 73 with several grooves 77 and a speed in revolutions per minute (rpm) corresponding to each of the several grooves 77. Specifically, the user visually identifies which groove of the driven pulley 60 that the drive belt 64 is positioned within and compares this to the corresponding groove 77 and speed on the label 72 to identify the speed of the driven pulley 60. It should be kept in mind that the label 72 can take many other forms than that illustrated such as being placed at another location on the scroll saw 10.

In operation, the motor 58 is powered by an appropriate power source (not shown) such that the motor 58 rotates the drive pulley 62 and the rotation is transferred to the driven pulley 60 by the drive belt 64. The driven pulley 60 then transfers the rotation to the lower arm 30 via the shafts 61 and 87 which converts the rotational motion into an up and down motion pivoting the lower arm 30 about 52 which results in the reciprocating sawing motion of the saw blade 20. The saw blade 20 then cuts the workpiece (not shown) and moves the upper arm 28 in a corresponding up and down motion such that the upper arm 28 pivots at 50. The up and down motion of the upper arm 28 is transferred to the is link member 32 at the pivotal connection between the link member 32 and the upper arm 28, discussed above. The rod 39 is able to rotate approximately two (2) degrees to allow for the pivoting motion of the upper arm 28. The slideable connection between the lower arm 30 and the link member 32 at the lower arm distal end 31 allows for the link member 32 to slideably engage the lower bracket 48 such that the up and down motion of the link member 32 does not substantially affect the motion of the lower arm 30. As a result of this slideable connection between the link member 32 and the lower arm 30, the arms 28 and 30 can move substantially independently of one another. Thus, the scroll saw 10 is not damaged and the workpiece is not marred if the saw blade 20 is disengaged from the upper arm 28 or lower arm 30 or if the saw blade breaks.

FIGS. 10 through 13 illustrate a retainer, designated generally as 74, that retains the upper arm 28 within the housing 12 if the saw blade 20 breaks or is disengaged from the upper arm 28. The retainer 74 comprises a hook member 76 and a torsion spring member 78. The hook member 78 has a hook portion 90 and a pin member 92. The pin member 92 has a boss 94 with a threaded recess 96 for receiving a screw 98. The boss 94 extends through an opening 100 in the housing 12 and the screw 98 is threaded into opening 96 thereby attaching the hook member 76 to the housing 12. The pin member 92 extends through opening 101 in the housing 12. The torsion spring 78 has a biasing arm 102 and several coil portions 104 which define a cylindrical opening 106 through the torsion spring 78. The torsion spring 78 is attached to the housing 12 by a screw 85. The screw 85 extends through a flat washer 81, a spacer 79, the opening 106 of the torsion spring 78 and is threadably received in threaded recess 108 in the housing 12. As can be seen in FIG. 13, the flat washer 81 and the spacer 79 are received within the opening 106 of the torsion spring 78.

Figure 10:
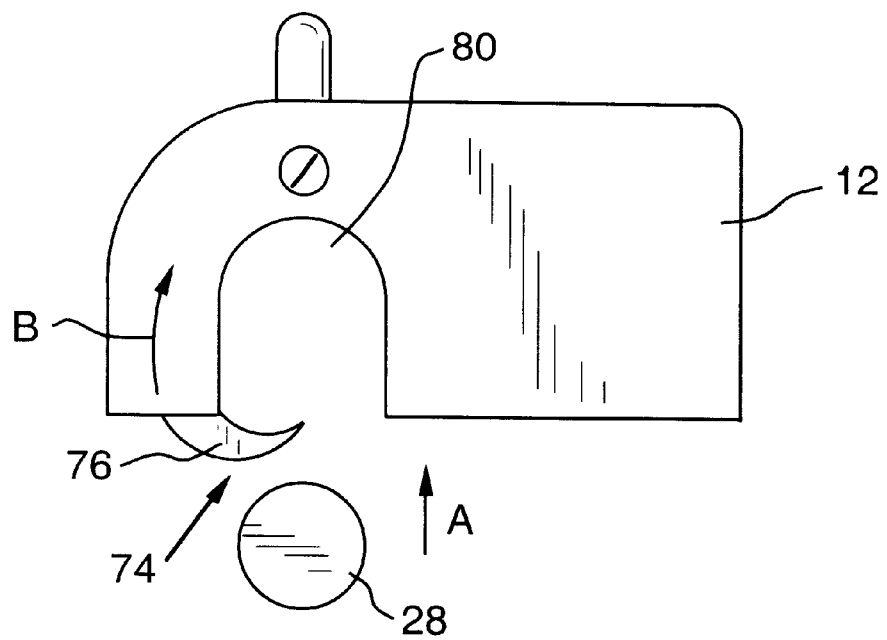
FIG. 10 is a side elevational view of a portion of the scroll saw shown in FIG. 1 with the retaining mechanism of the present invention in a disengaged position.
Figure 11:
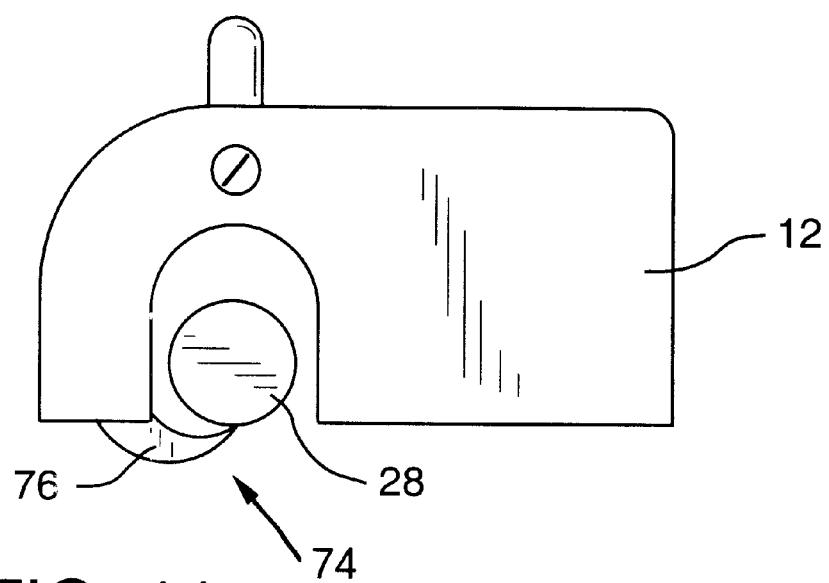
FIG. 11 is the side elevational view of the portion of the scroll saw shown in FIG. 10 with the retaining mechanism in an engaged position.

After the hook member 76 and the torsion spring 78 are attached to the housing 12, as described above, the biasing arm 102 engages the pin member 92 of the hook member 76 to bias the hook member 76 into the position shown in FIG. 10. If the saw blade 20 becomes disengaged from the upper arm 28 or if the blade breaks, the upper arm 28 may continue to reciprocate due to momentum. The upper arm 28 moves upwardly in the direction of arrow A, shown in FIG. 10. The upper arm 28 then engages the hook portion 90 of the hook member 76 which pivots about the longitudinal axis C of the screw 98 and allows the upper arm 28 to continue into the is recess 80 defined by the housing 12. The hook member 76 is then forced in the direction opposite to arrow B into its original position by the biasing arm 102 of the torsion spring 78 such that the hook member 76 now holds the upper arm 28 within the housing 12 and prevents it from moving downward where it could potentially result in marring of the workpiece.

Thus, the present invention represents a vast improvement over prior scroll saw arrangements. The unique arrangement of the present invention's arms enables the motion of the upper arm to be controlled to prevent damage to the workpiece should the blade break or become disengaged from one of the arms. The present invention is also well suited to accommodate and cut relatively large workpieces. In addition, the novel speed indication device of the present invention cannot only be advantageously employed in connection with scroll saws, but it can also be advantageously used in connection with any similarly arranged motor/pulley drive arrangement for a variety of different machines.

Those of ordinary skill in the art will recognize, however, that many modifications and variations of the present invention may be implemented without departing from the spirit and scope of the present invention. The foregoing description and the following claims are intended to cover all such modifications and variations.

What is claimed is:

1. An apparatus for a saw, said apparatus comprising:
   a first artn having a first end and a second end;
   a reciprocating second arm having a first end and a second end; and
   a saw blade attached to said second ends of said first arm and said second arm;
   a link member having a first end pivotally attached to said first end of said first arm and a second end slideably attached to said first end of said second arm such that said first end of said second arm can axially slide unrestricted and unbiased along said link member in a direction toward said first end of said first arm when the second ends of the first and second arms are not linked by a cutting member therebetween and said second arm is reciprocating.

2. The apparatus for a saw according to claim 1, wherein said first arm and said second arm are substantially parallel to one another.

3. The apparatus for a saw according to claim 1, wherein said link member comprises a shaft having a rod transversely attached at a first end portion of said shaft and pivotally attached to said first end of said first arm, and wherein a second end portion of said shaft has a stop member.

4. The apparatus for a saw according to claim 3, wherein a bushing is connected on each end of said rod.

5. A scroll saw comprising:
   a housing member;
   a first arm having first and second ends, said first arm being pivotally supported relative to said housing member;
   a reciprocating second arm having first and second ends, said second arm being pivotally supported relative to said housing member;
   a cutting member attached to said second ends of said first and second arms and extending therebetween;
   a linkage assembly attached to said first end of said first arm and said first end of said second arm such that said first ends of said first and second arms are slideably interconnected to form a parallel arm assembly, and wherein said linkage assembly comprises a shaft member having a first end pivotally affixed to said first end of said first arm and a second end slideably affixed to said first end of said second arm such that said first end of said second arm can axially slide unrestricted and unbiased along said link member in a direction toward said first end of said first arm when the second ends of the first and second arms are not linked by the cutting member therebetween and said second arm is reciprocating; and
   a motor assembly operably attached to said parallel arm assembly for imparting a reciprocating motion thereto relative to said housing member.

6. The scroll saw of claim 5, further comprising a retainer member affixed to said housing member to retain said first arm relative to said housing when said cutting member breaks or becomes detached from said first arm.

7. The scroll saw of claim 6, wherein said retainer member comprises a hook-shaped member pivotally affixed to said housing member adjacent said first arm for hooking said first arm therein.

8. The scroll saw of claim 7, wherein said retainer member is spring biased relative to said housing member.

9. A scroll saw, comprising:
   a housing member;
   a first arm having a first end and a second end, said first arm pivotally supported relative to said housing member;

a second arm having a first end and a second end, said second arm pivotally supported relative to said housing member;

a blade attached to said second ends of said first and second arms and extending therebetween;

means for slidably interconnecting said first end of said first arm to said first end of said second arm to form a parallel arm assembly;

means for imparting a reciprocating motion relative to said parallel arm assembly; and means for preventing said first arm from reciprocating relative to said housing when said blade breaks or becomes detached from one of said first arm and said second arm.

10. A scroll saw, comprising:

a housing member;

a first arm having a first end and a second end, said first arm pivotally supported relative to said housing member;

a reciprocating second arm having a first end and a second end, said second arm pivotally supported relative to said housing member;

a link member having a first end and a second end;

a blade attached to said second ends of said first and second arms and extending therebetween;

means for pivotably connecting said first end of said first arm to said first end of said link member and for slideably connecting said first end of said second arm to said second end of said link member such that a parallel arm assembly is formed such that when said blade is cutting a workpiece, said first arm is able to pivot at said first arm first end and said link member is able to slide relative to said second arm such that said first end of said second arm can axially slide unrestricted and unbiased along said link member in a direction toward said first end of said first arm when the second ends of the first and second arms are not linked by the blade therebetween and said second arm is reciprocating; and means for imparting a reciprocating motion relative to said parallel arm assembly.

11. A scroll saw, comprising:

a housing member;

a first arm having first and second ends, said first arm being pivotally supported relative to said housing member;

a second arm having first and second ends, said second arm being pivotally supported relative to said housing member;

a linkage assembly attached to said first end of said first arm and said first end of said second arm such that said first ends of said first and second arms are slideably interconnected to form a parallel arm assembly, and wherein said linkage assembly comprises a shaft member having a first end pivotally affixed to said first end of said first arm and a second end slideably affixed to said first end of said second arm;

a cutting member attached to said second ends of said first and second arms and extending therebetween;

a motor assembly operably attached to said parallel arm assembly for imparting a reciprocating motion thereto relative to said housing member; and a retainer member affixed to said housing member to retain said first arm relative to said housing when said cutting member breaks or becomes detached from said first arm.

12. The scroll saw of claim 11, wherein said retainer member comprises a hook-shaped member pivotally affixed to said housing member adjacent said first arm for hooking said first arm therein.

13. The scroll saw of claim 12, wherein said retainer member is a spring biased relative to said housing member.

* * * * *